(12) United States Patent
Ro et al.

(10) Patent No.: US 9,079,279 B2
(45) Date of Patent: Jul. 14, 2015

(54) ACTIVELY COMPENSATED STAGE HAVING 5-DOF MOTION ERROR COMPENSATION AND MOTION ERROR COMPENSATING METHOD THEREOF

(75) Inventors: Seung Kook Ro, Daejeon (KR); Jong-Kweon Park, Daejeon (KR); Byung-Sub Kim, Daejeon (KR); Sung Cheul Lee, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 13/702,678

(22) PCT Filed: May 31, 2012

(86) PCT No.: PCT/KR2012/004291
§ 371 (c)(1),
(2), (4) Date: Dec. 7, 2012

(87) PCT Pub. No.: WO2012/165872
PCT Pub. Date: Dec. 6, 2012

(65) Prior Publication Data
US 2014/0076207 A1 Mar. 20, 2014

(30) Foreign Application Priority Data
May 31, 2011 (KR) ........................ 10-2011-0052297

(51) Int. Cl.
*B23Q 1/62* (2006.01)
*G01B 5/004* (2006.01)
(Continued)

(52) U.S. Cl.
CPC .. *B23Q 1/58* (2013.01); *B23Q 3/02* (2013.01); *B23Q 5/28* (2013.01); *B23Q 11/0032* (2013.01); *B23Q 15/013* (2013.01); *F16C 29/025* (2013.01); *F16C 32/0674* (2013.01)

(58) Field of Classification Search
CPC .............. B23Q 1/58; B23Q 3/02; B23Q 5/28; B23Q 15/013; B23Q 1/38; B23Q 3/154; B23Q 3/1546; B23Q 1/621; G01B 5/008; G01B 7/004; B43L 13/022
USPC .............. 33/1 M, 503, 706, 707, 708; 108/20
See application file for complete search history.

(56) References Cited

U.S. PATENT DOCUMENTS 4,798,478 A * 1/1989 Crystal ........................... 384/12
5,228,358 A * 7/1993 Sakino et al. .............. 74/479.01
(Continued)

FOREIGN PATENT DOCUMENTS

| CH | 686619 | 5/1996 |
|---|---|---|
| DE | 19728233 | 1/1998 |

(Continued)

OTHER PUBLICATIONS

Korean Intellectual Property Office, International Search Report of PCT/KR2012/004291, Dec. 28, 2012.
(Continued)

*Primary Examiner* — Laura Martin
*Assistant Examiner* — Rhyan C Lange
(74) *Attorney, Agent, or Firm* — Lexyoume IP Meister, PLLC

(57) ABSTRACT

Disclosed are an actively compensated stage including: a guide support having first and second guide surfaces perpendicular to each other; a table having first and second sides opposite the first and second guide surfaces and having air bearings on the first and second sides; a driving linear motor moving the table straight in an x-axial direction; and a plurality of magnetic actuators applying a magnetic preload between the guide support and the table and changing a magnetic force between the guide support and the table to compensate for 5-DOF motion errors generated in the table.

9 Claims, 5 Drawing Sheets

(51) Int. Cl.

| | | |
|---|---|---|
| *G01B 7/004* | (2006.01) | |
| *B23Q 1/58* | (2006.01) | |
| *B23Q 5/28* | (2006.01) | |
| *B23Q 11/00* | (2006.01) | |
| *B23Q 3/02* | (2006.01) | |
| *B23Q 15/013* | (2006.01) | |
| *F16C 29/02* | (2006.01) | |
| *F16C 32/06* | (2006.01) | |
| *G01D 5/347* | (2006.01) | |
| *G01B 7/00* | (2006.01) | |

(56) References Cited

U.S. PATENT DOCUMENTS

| | | | | |
|---|---|---|---|---|
| 5,821,981 | A * | 10/1998 | Menard et al. | 347/260 |
| 6,320,649 | B1 | 11/2001 | Miyajima | |
| 7,257,902 | B2 * | 8/2007 | Gao et al. | 33/1 M |
| 7,942,099 | B2 * | 5/2011 | Ro et al. | 104/284 |

FOREIGN PATENT DOCUMENTS

| | | | | |
|---|---|---|---|---|
| JP | 61-290231 | 12/1986 | | |
| JP | 04-008914 | 1/1992 | | |
| JP | 05-215133 | 8/1993 | | |
| JP | 06-019550 | 1/1994 | | |
| JP | 06-167414 | 6/1994 | | |
| JP | 06-318115 | 11/1994 | | |
| JP | 07-088850 | 9/1995 | | |
| JP | 2573390 | 10/1996 | | |
| JP | 09-017846 | 1/1997 | | |
| JP | 10-307013 | 11/1998 | | |
| JP | 11-223690 | 8/1999 | | |
| JP | 2000-170767 | 6/2000 | | |
| JP | 2000170767 A | * | 6/2000 | F16C 32/06 |
| JP | 2000-0263357 | 9/2000 | | |
| JP | 2001-069746 | 3/2001 | | |
| JP | 2002-120120 | 4/2002 | | |
| JP | 2002-189091 | 7/2002 | | |
| JP | 2004-036680 | 2/2004 | | |
| JP | 2008-546965 | 12/2008 | | |
| KR | 10-0242923 | 5/1997 | | |
| KR | 10-1998-0051975 | 9/1998 | | |
| KR | 10-1999-0066321 | 8/1999 | | |
| KR | 10-2001-0032211 | 4/2001 | | |
| KR | 10-2004-0005319 | 1/2004 | | |
| KR | 10-2004-0012296 | 2/2004 | | |
| KR | 10-2005-0086027 | 8/2005 | | |
| KR | 10-2006-0035838 | 4/2006 | | |
| KR | 10-2007-0007692 | 1/2007 | | |

OTHER PUBLICATIONS

European Patent Office, Extended European search report dated Oct. 13, 2014 of the application No. PCT/KR2012004291.

* cited by examiner

Fig. 5
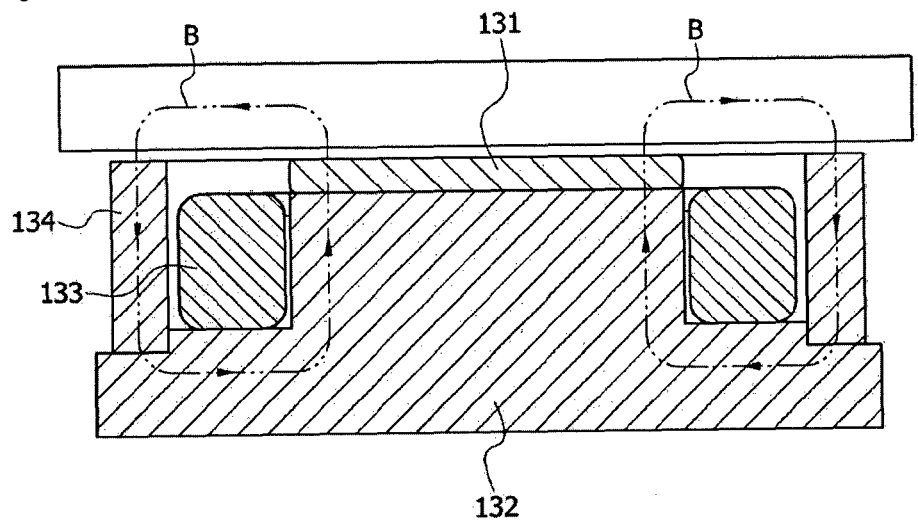
[Fig. 6]
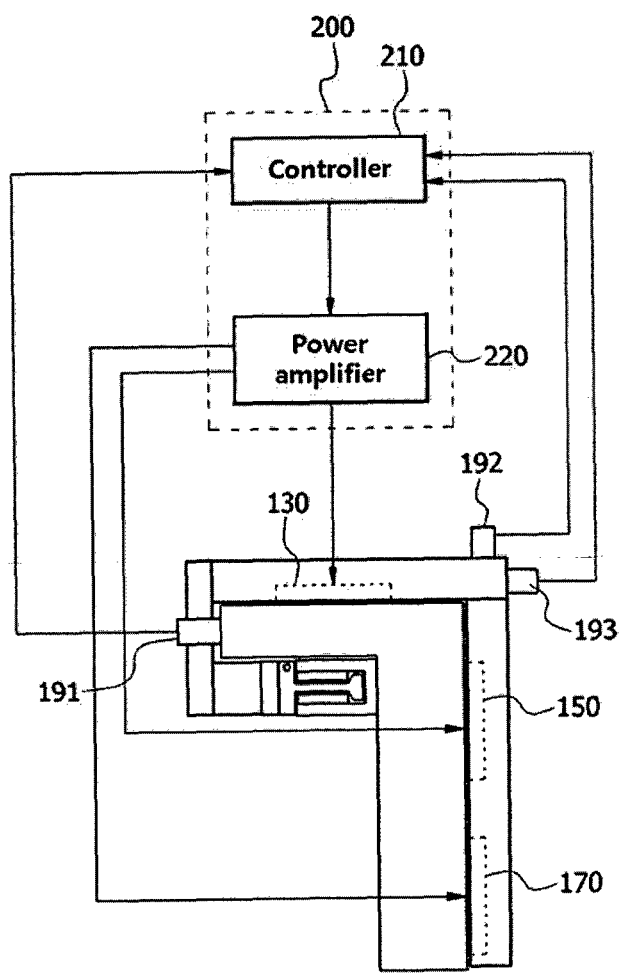

ACTIVELY COMPENSATED STAGE HAVING 5-DOF MOTION ERROR COMPENSATION AND MOTION ERROR COMPENSATING METHOD THEREOF

CROSS-REFERENCE TO RELATED APPLICATION

This application is a National Stage application of PCT/KR2012/004291 filed on May 31, 2012, which claims priority to and the benefit of Korean Patent Application No. 10-2011-0052297 in the Korean Intellectual Property Office on May 31, 2011, the entire contents of which are incorporated herein by reference.

TECHNICAL FIELD

The present invention relates to a carrying stage that carries a machining apparatus, and more particularly, to an actively compensated stage that can compensate for a motion error that may be generated when carrying a machining apparatus.

BACKGROUND ART

In general, the carrying stages for machining apparatuses are devices that carry a machining apparatus such that the machining apparatuses can machine a workpiece while moving straight.

The carrying stages include a guide support and a table moving straight on the guide support. A machining apparatus is disposed on the table, and carried by the straight movement of the table and performs mechanical working.

An air bearing is disposed between the guide support and the table and allows the table to move above the guide support by forming an air layer between the guide support and the table.

An error in surface machining on the guide support causes a motion error when the table is carried and this is a direct cause of a machining error of a workpiece in the mechanical work. A technology of compensating for a motion error by generating a magnetic force between the table and the guide support has been proposed in order to solve the problem.

However, the motion error of the table may be generated in various ways with 5-DOF(degrees of freedom) and further research is necessary for the technology that can compensate for the various types of motion error.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an actively compensated stage having a structure having advantages of compensating 5-DOF motion errors that may be generated when a machining apparatus is carried, and a motion error compensating method thereof.

Solution to Problem

An exemplary embodiment of the present invention provides an actively compensated stage including: a guide support having first and second guide surfaces perpendicular to each other; a table having first and second sides opposite the first and second guide surfaces and having air bearings on the first and second sides; a driving linear motor moving the table straight in an x-axial direction; and a plurality of magnetic actuators applying a magnetic preload between the guide support and the table and changing a magnetic force between the guide support and the table to compensate for 5-DOF motion errors generated in the table, in which the magnetic actuators include: first and second actuators spaced in the x-axial direction on the first side; third and fourth actuators spaced in the x-axial direction on the second side; and a fifth actuator spaced from the third and fourth actuators in a z-axial direction on the second side.

The 5-DOF motion errors may include a y-axial straightness motion error, a z-axial straightness motion error, a rolling error, a pitching error, and a yawing error.

The first to fifth actuators may include: a permanent magnet disposed opposite the guide support; an inner core supporting the permanent magnet; a coil wound around the inner core; and an outer core disposed around the coil in a ring shape.

The actively compensated stage may further include: a linear encoder sensing a movement distance of the table; and a control unit calculating a control current value corresponding to the position of the table on the basis of the sensing value of the linear encoder and applying corresponding currents to the first to fifth actuators.

The control unit may calculate the control current value on the basis of a motion error value according to a movement position of the table which is calculated in advance.

The control unit may include: a controller generating a control signal relating to the control current value; and a power amplifier applying the first to fifth corresponding currents in accordance with the control signal.

The actively compensated stage may further include accelerometers disposed at the table and detecting vibration signals of the table, in which the control unit may calculate a damping control current value for damping 5-DOF vibration errors of the table on the basis of the vibration signals. The vibration signals may pass first to fifth bandpass filters that pass signals in a natural frequency band respectively corresponding to 5-DOF vibration modes, and the control unit may control the magnetic actuators through feedback control on the basis of the filtered signals.

Another exemplary embodiment of the present invention provides a motion error compensating method of the actively compensated stage, including: calculating compensating information on the basis of motion error values in 5-DOF directions according to the movement position of the table which is measured in advance; calculating a control current value corresponding to the position of the table on the basis of the compensating information and the sensing value supplied from the linear encoder, as the table moves straight; and applying a current corresponding to the control current value to the first to fifth actuators such that a control force is applied to between the table and the guide support.

Advantageous Effects of Invention

According to the exemplary embodiments of the present invention having the configuration, it is possible to provide a structure of an actively compensated stage that can compensate for 5-DOF motion errors.

Further, since vibration damping control using accelerometers is added, it is possible to further improve accuracy in carrying the actively compensated stage.

In addition, it is possible to reduce cost for machining by implementing a carrying stage, which can compensate for 5-DOF motion errors, in a simple structure.

BRIEF DESCRIPTION OF DRAWINGS

FIG. 5 is a cross-sectional view of the first actuator taken along line V-V of FIG. 4.

FIG. 6 is a block diagram illustrating a motion error compensating method of an actively compensated stage according to an exemplary embodiment of the present invention.

MODE FOR THE INVENTION

Hereinafter, an actively compensated stage and a motion error compensating method thereof according to an exemplary embodiment of the present invention will be described in more detail with reference to the accompanying drawings.

Figure 1:
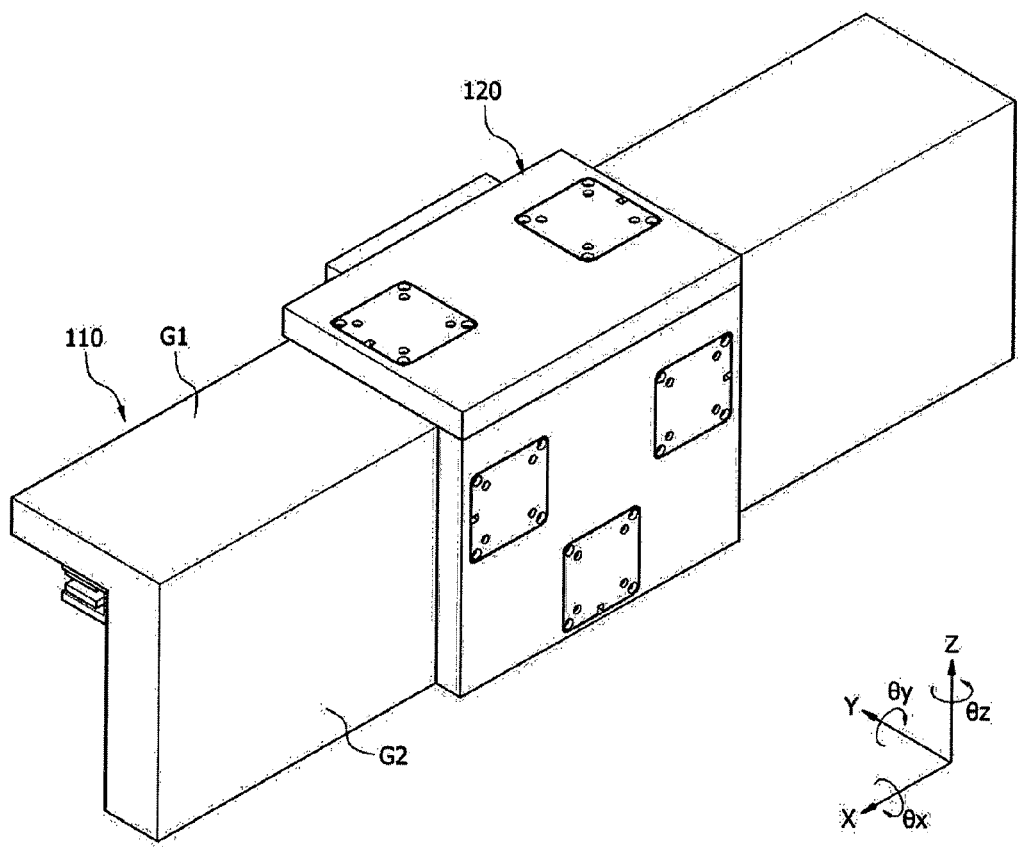
FIG. 1 is a perspective view of an actively compensated stage according to an exemplary embodiment of the present invention.
Figure 2:
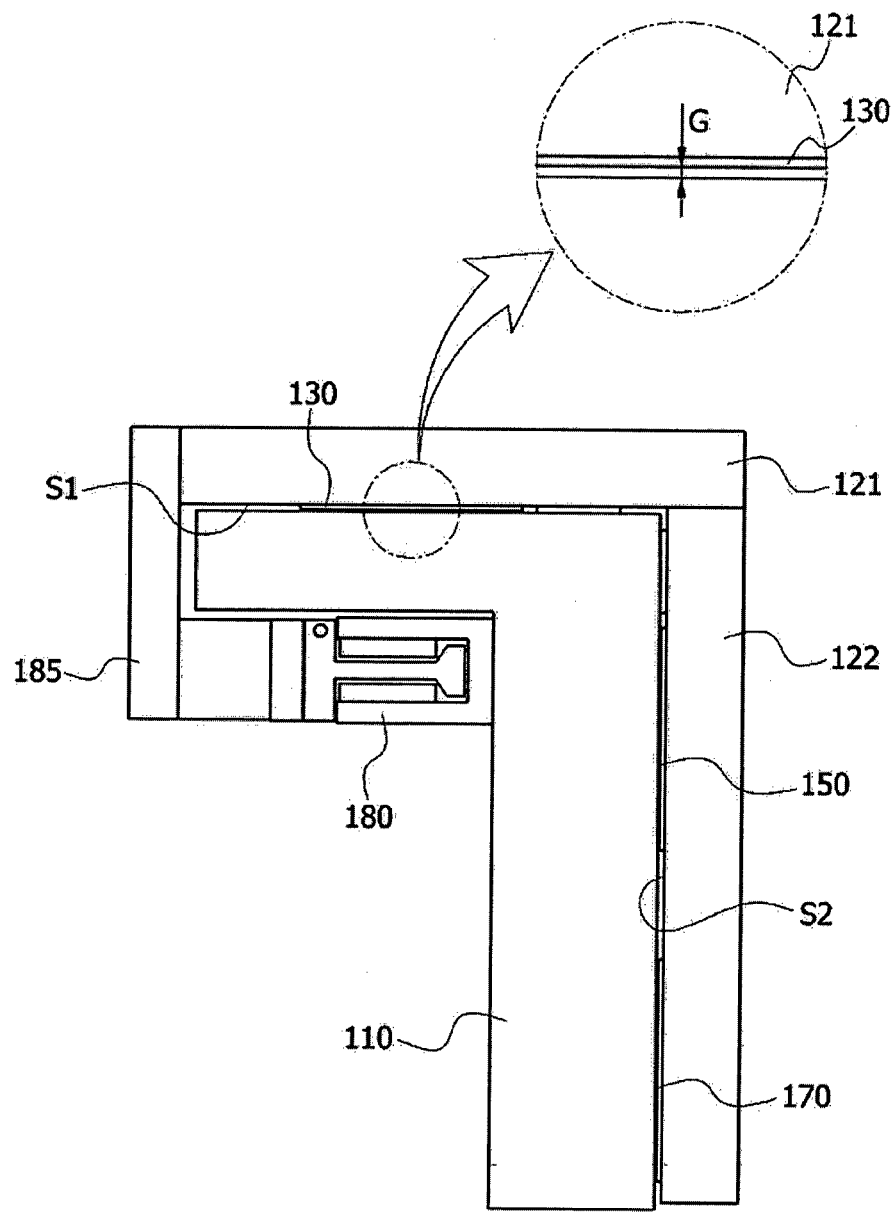
FIG. 2 is a front view of the actively compensated stage of FIG. 1.
Figure 3:
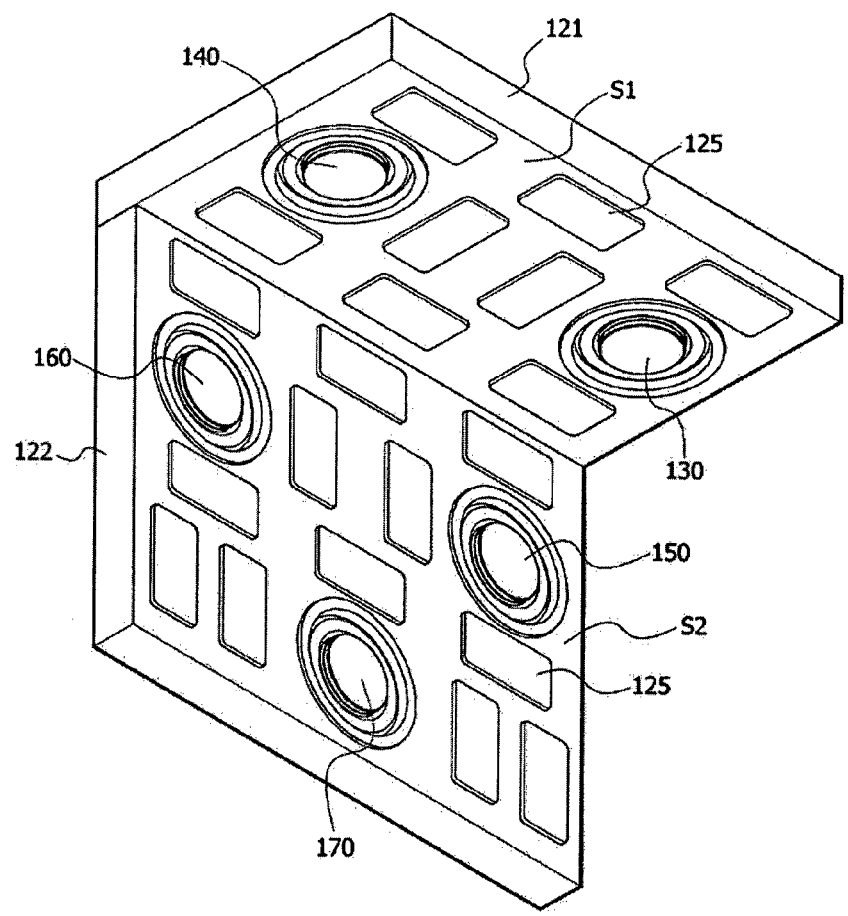
FIG. 3 is a perspective view of the table shown in FIGS. 1 and 2, seen from the rear.

FIG. 1 is a perspective view of an actively compensated stage according to an exemplary embodiment of the present invention and FIG. 2 is a front view of the actively compensated stage of FIG. 1. FIG. 3 is a perspective view of the table shown in FIGS. 1 and 2, seen from the rear.

An actively compensated stage according to an exemplary embodiment of the present invention includes a guide support 110, a table 120, a driving linear motor 180, and magnetic actuators 130 to 170.

The guide support 110 is a structure installed and fixed on an installation surface and has first and second guide surfaces G1 and G2 perpendicular to each other. Although the present exemplary embodiment exemplifies when the first guide surface G1 is a horizontal surface and the second guide surface G2 is a vertical surface, the opposite case is possible.

The table is a structure that moves straight on the guide support 110 while supporting a machining apparatus and has first and second sides S1 and S2 opposite the first and second guide surfaces G1 and G2. That is, the first and second sides S1 and S2 are also perpendicular to each other. According to the present exemplary embodiment, the table 120 has a structure including a first plate 121 and a second plate 122 vertically connected to a side of the first plate 121. In this configuration, the first and second plates 121 and 122 have the first and second sides S1 and S2, respectively.

Air bearings 125 are disposed on the first and second sides S1 and S2 of the table 120 and allow the table 120 to move with a predetermined gap from the guide support 110 by forming air layers between the guide support 110 and the table 120. The air bearings 125 have a well-known structure and the detailed description is not provided. The air bearings 125 are disposed at a plurality of positions on the first and second sides 51 and S2 such that a uniform pressure is applied throughout the first and second sides.

The driving linear motor 180 has a function of moving the table 120 straight in the x-axial direction. The present exemplary embodiment exemplifies when a linear motor is used as the driving linear motor 180. The driving linear motor 180 is mounted at the guide support 110 and connected to a connecting bracket 185 fixed to the first plate 121.

The magnetic actuators 130 to 170 are disposed on the table 120 and have a function of applying a magnetic preload between the guide support 110 and the table 120. The stiffness of the air bearings 125 is in inverse proportion to the gap G between the guide support 110 and the table 120 and it is possible to increase the stiffness of the air bearings 125 by maintaining the gap G at a predetermined level or less in accordance with applying of a magnetic preload.

The magnetic actuators 130 to 170, as described above, generates the magnetic preload and compensate for 5-DOF motion errors of the table 120 by changing the magnetic force between the guide support 110 and the table 120.

The 5-DOF motion errors may be generated in two directions (y-axial and z-axial directions) perpendicular to the carrying direction (x-axial direction) of the table 120, a rotational direction ($\theta_x$ direction, roll motion) about the x axis, a rotational direction ($\theta_y$ direction, pitch motion) about the y axis, and a rotational direction ($\theta_z$ direction, yaw motion) about the z axis, and the motion errors in the five directions maybe called any-axial straightness motion error, a z-axial straightness motion error, a rolling error, a pitching error, and a yawing error.

The magnetic actuator has a structure including five actuators to compensate for the 5-DOF motion errors.

The first and second actuators 130 and 140 are disposed on the first side S1 of the table 120 to be spaced from each other in the x-axial direction. Further, the third and the fourth actuators 150 and 160 are disposed on the second side S2 of the table 120 to be spaced from each other in the x-axial direction. The fifth actuator 170 is spaced from the third and fourth actuators 150 and 160 in the z-axial direction. The fifth actuator 170 may be disposed at a position spaced from the middle position between the third and fourth actuators 150 and 160 in the z-axial direction.

According to this structure, the first to fifth actuators 130 to 170 may apply a control force with 5-DOF. For example, when the same magnetic force is generated from the first and second actuators 130 and 140, a z-axial-directional force is generated, and when different magnetic forces are generated from the first and second actuators 130 and 140, a pitch-directional control force is generated. The control ways for the other directions are similarly implemented.

Figure 4:
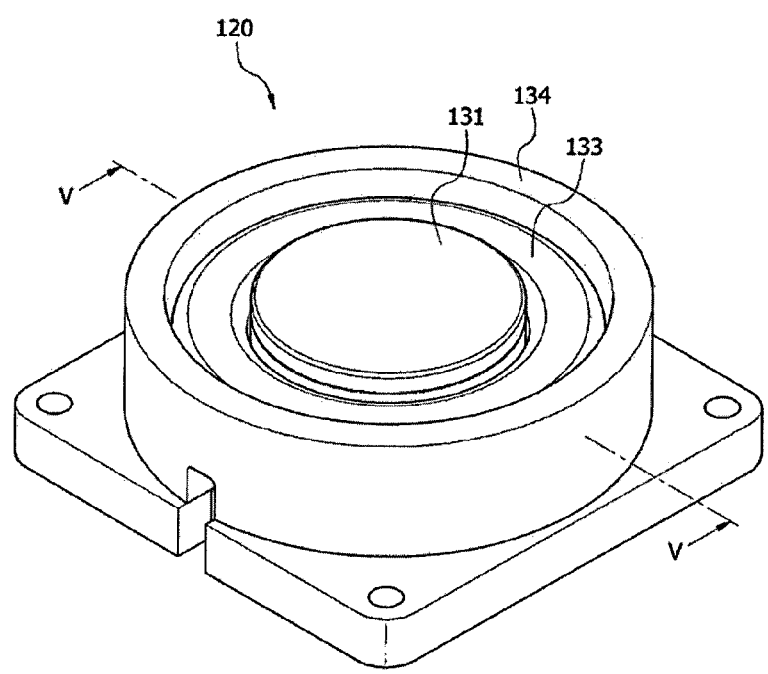
FIG. 4 is a perspective view of a first actuator shown in FIG. 3.

FIG. 4 is a perspective view of the first actuator shown in FIG. 3 and FIG. 5 is a cross-sectional view of the first actuator taken along line V-V of FIG. 4. In the following description, the structure of the first actuator 130 is exemplified, but the second to fifth actuators 140 to 170 also have the same configuration as the first actuator 130.

The first actuator 130 has a structure including a permanent magnet 131, an inner core 132, a coil 133, and an outer core 134.

The permanent magnet 131 is disposed opposite the guide support 110 and has a function of generating a magnetic preload. The inner core 132 is made of a magnetic material such as steel and has a structure supporting the permanent magnet 131. The inner core 132 has the shape of a cylinder (circular cylinder) and the coil 133 is wound on the outer circumferential surface of the inner core 132. The outer core 134 is disposed around the coil 133 and made of a ring-shaped magnetic material.

When a current is applied to the coil 133, as shown in FIG. 4, a magnetic field B is formed in a closed loop shape and the magnitude of the magnetic force can be adjusted by adjusting the magnitude and direction of the applied current.

Figure 7:
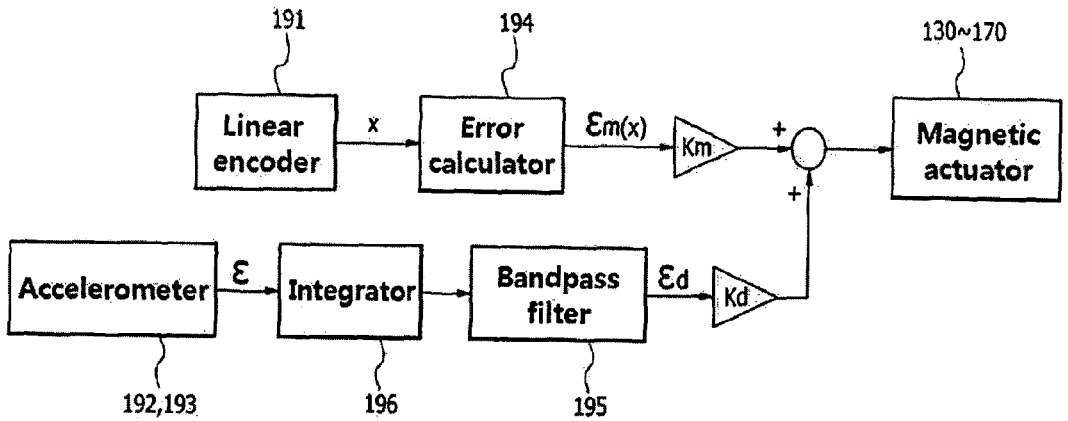
FIG. 7 is a diagram illustrating a control algorithm of control unit shown in FIG. 6.

FIG. 6 is a diagram illustrating a motion error compensating method of an actively compensated stage according to an exemplary embodiment of the present invention and FIG. 7 is a diagram illustrating a control algorithm of control unit.

Referring to FIG. 6, a linear encoder 191 that senses the movement distance of the table 120 is disposed between the guide support 110 and the table 120. Further, a control unit 200 that controls the operations of the first to fifth actuators 130 to 170 is connected to the linear encoder 191. The control unit 200 includes a controller 210 generating a control signal relating to a control current value and a power amplifier 220 applying corresponding currents to the first to fifth actuators 130 to 170 in accordance with the control signal.

It is possible to obtain a motion error value according to the movement position of the table 120 in advance through repetitive experiments. The motion error value may be measured by a laser interferometer, gap sensors and the like.

Figure 8:
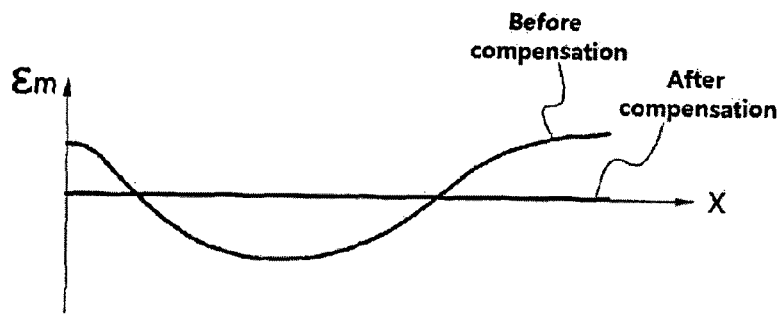
FIG. 8 is a graph showing a motion error according to a movement distance of a table.

FIG. 8 is a graph showing a motion error according to a movement distance of a table. The graph (before compensation) of FIG. 8 may be obtained from the measuring result of motion error value. In FIG. 8, the horizontal axis is the movement distance of the table 120 and the vertical axis is the motion error value. The graph may be obtained for each of the 5-DOF motions. For reference, FIG. 8 also shows a result that movement error is eliminated after compensation.

It is possible to calculate the compensating information on the control current value on the basis of the motion error value, which can be expressed by the following equation, $$i_m(x) = K_m * \epsilon_m(x)$$

where $i_m(x)$ is a control current value according to the movement position of the table 120, $\epsilon_m(x)$ is a motion error according to the movement position of the table 120, and $K_m$ is a control gain. Error calculator 194 of the control unit 200 calculates error based on the measuring result to calculate $\epsilon_m(x)$. Here, $i_m(x)$, $K_m$ and $\epsilon_m(x)$ are composed of matrix, and the compensating information is stored in a storage space such as a memory in the control unit 200.

When the driving linear motor 180 is operated and moves the table 120 for mechanical work, the linear encoder 191 transmits the movement distance of the table 120 to the control unit 200. The control unit 200 calculates a control current value corresponding to the position of the table 120 on the basis of the sensing value of the linear encoder 191 and the compensating information. The control unit 200 applies a current corresponding to the calculated control current value to the first to fifth actuators 130 to 170 such that a control force is applied to between the table 120 and the guide support 110. The control unit 200 controls the magnetic actuators 130 to 170 through feedforward control.

Meanwhile, the table 120 may vibrate while moving and the vibration may also be generated with 5-DOF. The actively compensated stage according to an exemplary embodiment of the present invention may be further provided with a configuration for damping a vibration error generated by the 5-DOF vibrations.

The table 120 is additionally equipped with accelerometers 192 and 193 for damping control of a vibration error. The accelerometers 192 and 193 are devices for detecting a vibration signal of the table 120 and disposed on the side opposite to the first side S1 and the side opposite to the second side S2.

The control unit 200 receives vibration signals from the accelerometers 192 and 193 and calculates a damping control current value for damping the vibration error of the table 120 on the basis of the signals.

Since control proportional to a velocity has to be conducted to provide damping to the table 120, the accelerated signals from the accelerometers 192 and 193 are integrated by the integrator 196 to obtain a velocity signal.

Figure 9:
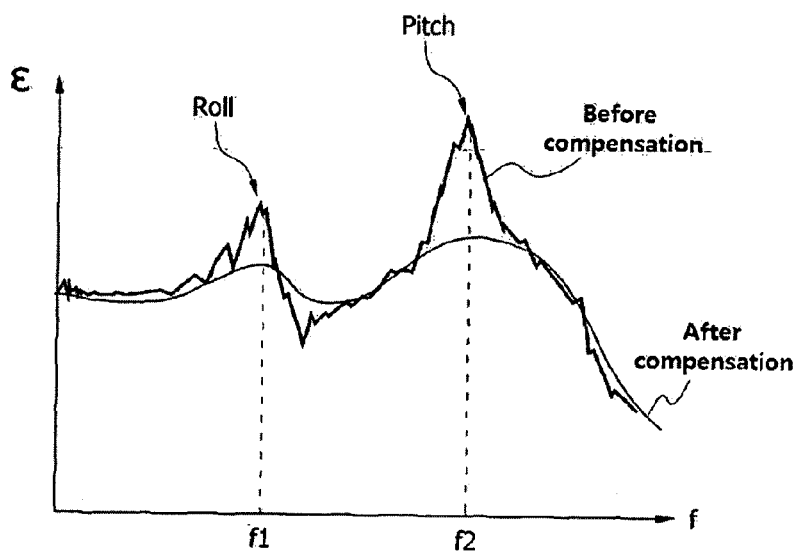
FIG. 9 is a graph showing the magnitude of a vibration error according to the number of vibrations of a table.

FIG. 9 is a graph showing the magnitude of a vibration error according to the number of vibrations of a table. The graph shown in FIG. 9 may be obtained by an impact test and the horizontal axis and the vertical axis are the number of vibrations and a vibration error, respectively. According to the graph, the 5-DOF motions each have a specific natural frequency band. FIG. 9 exemplifies when the natural frequency is $f_1$ in a rolling mode and the natural frequency is $f_2$ in a pitch mode, and showing results before and after compensation.

Referring to FIG. 9, the vibration errors detected by the accelerometers 192 and 193 are allowed to pass first to fifth bandpass filter 195. The first to fifth bandpass filters 195 pass signals in the natural frequency band corresponding to 5-DOF vibration modes, respectively.

The compensating information for the vibration damping control can be expressed by the following equation, $$i_d = K_d * \epsilon_d$$

where $i_d$ is a control current value of the table 120, $\epsilon_d$ is a filtered velocity vibration signal by integrating the acceleration signal $\epsilon$ detected by the accelerometers 192 and 193 by the band pass filter 195, and $K_d$ is a control gain. Thus, a control current value is obtained by multiplying the velocity vibration signal, the bandpass and the control gain. Here, $i_d$, $K_d$ and $\epsilon_d$ are composed of matrix, and the control unit 200 controls the magnetic actuators 130 to 170 through feedback control on the basis of the signals filtered through the first to fifth bandpass filters 195.

To sum up, the control unit 200 generates a control signal through feedforward control on the basis of the positional information (x) of the table 120 detected by the linear encoder 191, generates a control signal through feedback control on the basis of the vibration signal ($\epsilon$) detected by the accelerometers 192 and 193, and the sum of the control signals is supplied to the magnetic actuators 130 to 170.

Accordingly, since the error is compensated in consideration of the vibration error as well as the motion error, it is possible to more improve accuracy of carrying the actively compensated stage. However, the present invention is not limited to a configuration considering both of a motion error and a vibration error, it is possible to include a configuration considering only a motion error.

While an actively compensated stage and a motion error compensating method thereof according to the present invention have been described with reference to the accompanying drawings, it is to be understood that the invention is not limited to the disclosed embodiments, but, on the contrary, is intended to cover various modifications and equivalent arrangements included within the spirit and scope of the appended claims.

The invention claimed is:

1. An actively compensated stage comprising:
    a guide support having first and second guide surfaces perpendicular to each other;
    a table having first and second sides opposite the first and second guide surfaces and having air bearings on the first and second sides;
    a driving linear motor moving the table straight in an x-axial direction; and a plurality of magnetic actuators applying a magnetic preload between the guide support and the table and changing a magnetic force between the guide support and the table to compensate for 5-DOF motion errors generated in the table, wherein the magnetic actuators include:

first and second actuators spaced in the x-axial direction on the first side;

third and fourth actuators spaced in the x-axial direction on the second side; and a fifth actuator spaced from the third and fourth actuators in a z-axial direction on the second side, and the first to fifth actuators respectively include:

a permanent magnet disposed opposite the guide support to generate a magnetic preload;

an inner core supporting the permanent magnet;

a coil wound around the inner core; and an outer core disposed around the coil in a ring shape to surround the coil.

2. The actively compensated stage of claim 1, wherein:

the table includes:

a first plate having the first side; and a second plate vertically connected to a side of the first plate and having the second side, and the air bearings are disposed at a plurality of positions on the first and second sides.

3. The actively compensated stage of claim 1, wherein:

the 5-DOF motion errors include:

a y-axial straightness motion error, a z-axial straightness motion error, a rolling error, a pitching error, and a yawing error.

4. The actively compensated stage of claim 1, further comprising:

a linear encoder sensing a movement distance of the table; and a control unit calculating a control current value corresponding to the position of the table on the basis of the sensing value of the linear encoder and applying the corresponding currents to the first to fifth actuators.

5. The actively compensated stage of claim 4, wherein:

the control unit calculates the control current value on the basis of a motion error value according to a movement position of the table which is calculated in advance.

6. The actively compensated stage of claim 5, wherein:

the control unit includes:

a controller generating a control signal relating to the control current value; and a power amplifier applying the first to fifth corresponding currents in accordance with the control signal.

7. The actively compensated stage of claim 5, further comprising:

accelerometers disposed at the table and detecting vibration signals of the table, wherein the control unit calculates a damping control current value for damping 5-DOF vibration errors of the table on the basis of the vibration signals.

8. The actively compensated stage of claim 7, wherein:

the vibration signals pass first to fifth bandpass filters that pass signals in a natural frequency band respectively corresponding to 5-DOF vibration modes, and the control unit controls the magnetic actuators through feedback control on the basis of the filtered signals.

9. A motion error compensating method of the actively compensated stage of claim 1, the method comprising:

calculating compensating information on the basis of motion error values in 5-DOF directions according to the movement position of the table which is measured in advance;

calculating a control current value corresponding to the position of the table on the basis of the compensating information and the sensing value supplied from the linear encoder, as the table moves straight; and applying a current corresponding to the control current value to the first to fifth actuators such that a control force is applied to between the table and the guide support.

* * * * *